United States Patent [19]

Iwick

[11] Patent Number: 5,199,260
[45] Date of Patent: Apr. 6, 1993

[54] WASTEGATE ACTUATOR CONTROL VALVE FOR A TURBOCHARGER

[75] Inventor: Michael A. Iwick, Carol Stream, Ill.

[73] Assignee: Navistar International Transporation Corp., Chicago, Ill.

[21] Appl. No.: 808,407

[22] Filed: Dec. 16, 1991

[51] Int. Cl.$^5$ .............................................. F02B 37/12
[52] U.S. Cl. ..................................... 60/602; 137/107
[58] Field of Search ................. 60/600, 601, 602, 603; 137/107

[56] References Cited

U.S. PATENT DOCUMENTS

| 228,532 | 6/1880 | Hoyt | 137/107 |
|---|---|---|---|
| 1,601,943 | 10/1926 | Conrader | 137/107 |
| 1,933,905 | 11/1933 | Hawks | 137/107 X |
| 2,670,751 | 3/1954 | Wilson | 137/107 |
| 3,270,951 | 9/1966 | Reed | 60/602 |
| 4,561,407 | 12/1985 | Jaussi et al. | 60/602 X |

*Primary Examiner*—Michael Koczo
*Attorney, Agent, or Firm*—Dennis K. Sullivan

[57] ABSTRACT

A wastegate actuator control valve for a wastegate of a turbocharger of an internal combustion engine is disposed in the intake manifold pressure supply line to the wastegate actuator and has a spring-biassed piston preventing intake manifold pressure from being transmitted through said line until a predetermined intake manifold or boost pressure is reached. The valve housing also has a bleed orifice communicating to the atmosphere to relieve any residual pressure in the actuator when the valve is closed but which bleed orifice is closed upon the piston moving to the open position. Such residual pressure relief results in the full preload of the actuator spring being exerted to completely close the wastegate. Further, the piston is provided with a metering orifice through which the intake manifold pressure flows to the wastegate actuator. This delays the wastegate valve response time during acceleration, increasing available horsepower at intermediate engine speeds and improving transient exhaust gas emissions.

11 Claims, 2 Drawing Sheets

WASTEGATE ACTUATOR CONTROL VALVE FOR A TURBOCHARGER

BACKGROUND OF THE INVENTION

The present invention pertains to a control valve for an actuator of a wastegate of a turbocharged engine. More particularly, the control valve acts as a check valve in a pressure line from a compressor of a turbocharger to the wastegate actuator, to prevent any compressor pressure from being communicated to the actuator until the compressor pressure reaches a predetermined level and permitting the pressure in the actuator to be bled to the atmosphere while also acting as a metering valve to delay the operation of the wastegate actuator during engine acceleration.

THE PRIOR ART

Internal combustion engines, particularly diesel engines, are provided with turbochargers to increase the mass of air supplied to the combustion chamber and, with an appropriate increase of fuel, at the proper air/fuel ratio, ultimately increase the available engine horsepower. Because the turbine end of the turbocharger operates on the mass flow of the exhaust gases therethrough and because the exhaust gas from a piston engine is highly dependent on engine speed, it is difficult to achieve optimum air flow to an engine throughout the entire range of engine operating speeds. With a conventional turbocharger, if optimum airflow is provided at low and intermediate engine speeds, overboosting will occur at high engine speeds, which is detrimental to engine performance and also, by increasing the peak cylinder pressure, to engine durability, in extreme cases causing catastrophic engine failure.

It is well known to overcome such overboosting by incorporating a wastegate into the turbocharger, i.e., an intake manifold pressure responsive bypass valve allowing exhaust gases to bypass the turbine of the turbocharger and be discharged directly into the exhaust system, downstream of the turbocharger. The wastegate valve position, as it is relates to opening and closure thereof, is determined by a wastegate actuator which conventionally comprises a spring biassed diaphragm connected by a linkage to the wastegate valve. Operation of the diaphragm is controlled by intake manifold pressure so that when the pressure overcomes the preload of the actuator spring, the spring is compressed, allowing linkage to open the wastegate valve. Conversely, when the intake manifold pressure falls below the level of the spring preload, the wastegate valve should be in the closed position thereof.

However, with prior art wastegate actuators, the intake manifold pressure is constantly applied against the diaphragm in the actuator. This pressure operates against the spring preload, reducing its effect. Additionally, the pressure exerted by exhaust gases flowing through the wastegate further reduces the effective pressure of the actuator spring and, under certain conditions, does not allow the wastegate valve to fully close. These conditions arise during periods of peak engine torque when the intake manifold pressure to the actuator combined with the exhaust pressure within the wastegate equal or rise above the preload of the actuator spring, causing the wastegate valve to remain open.

As a simple example of this condition, if the actuator spring preload were set to 25 pounds and the intake manifold pressure produced a 10 pound force on the diaphragm, then an exhaust gas pressure producing a load of 15 pounds or more on the wastegate valve would not allow the wastegate valve to close and exhaust gas would leak through the wastegate rather than being applied to the turbocharger turbine when required, thereby lowering the output or boost pressure of the compressor. Such wastegate leakage has been found to reduce boost pressure by as much as 2" Hg.

By manually closing the wastegate when the engine is at its peak torque operating point, an increase in turbocharger turbine speed is produced, inherently increasing intake manifold boost pressure and improving engine performance.

SUMMARY OF THE INVENTION

A primary object of the present invention is to provide control apparatus for a turbocharged internal combustion engine which operates to maintain a wastegate valve of a turbocharger thereon completely closed until the intake manifold or boost pressure reaches the desired level, thereby increasing intake manifold boost pressure during peak torque operation and increasing efficiency.

A further object of the invention is to provide a wastegate control apparatus which will delay the wastegate response time during acceleration, thereby increasing intake manifold pressure and available horsepower at intermediate speeds and improving transient exhaust gas emissions.

Yet a further object of the invention is to provide a wastegate control apparatus which, upon the intake manifold pressure falling below a predetermined level, bleeds residual pressure from a wastegate actuator to atmosphere to assist in closing the wastegate and maintaining closure.

These objects and others as may become apparent hereinafter are specifically met in a wastegate actuator control valve disposed in the intake manifold pressure supply line to the wastegate actuator having a spring-biassed valve piston preventing intake manifold pressure from being transmitted through said line until a predetermined intake manifold or boost pressure is reached, the valve housing having a bleed orifice communicating to the atmosphere to relieve any residual pressure in the actuator when the piston is closed but which bleed orifice is closed upon the piston moving to the open position. Such residual pressure relief results in the full preload of the actuator spring being exerted, completely closing the wastegate. Further, the piston is provided with an orifice through which the intake manifold pressure flows to the wastegate actuator. This delays the wastegate valve response time during acceleration, increasing available horsepower at intermediate engine speeds and improving transient exhaust gas emissions.

BRIEF DESCRIPTION OF THE DRAWINGS

Other objects and advantages of the invention will become more apparent upon perusal of the detailed description thereof and upon inspection of the drawings in which:

FIG. 2 is an axial cross-section through the valve of

FIG. 1, showing the valve in the closed position;

DESCRIPTION OF THE PREFERRED EMBODIMENT

Figure 1:
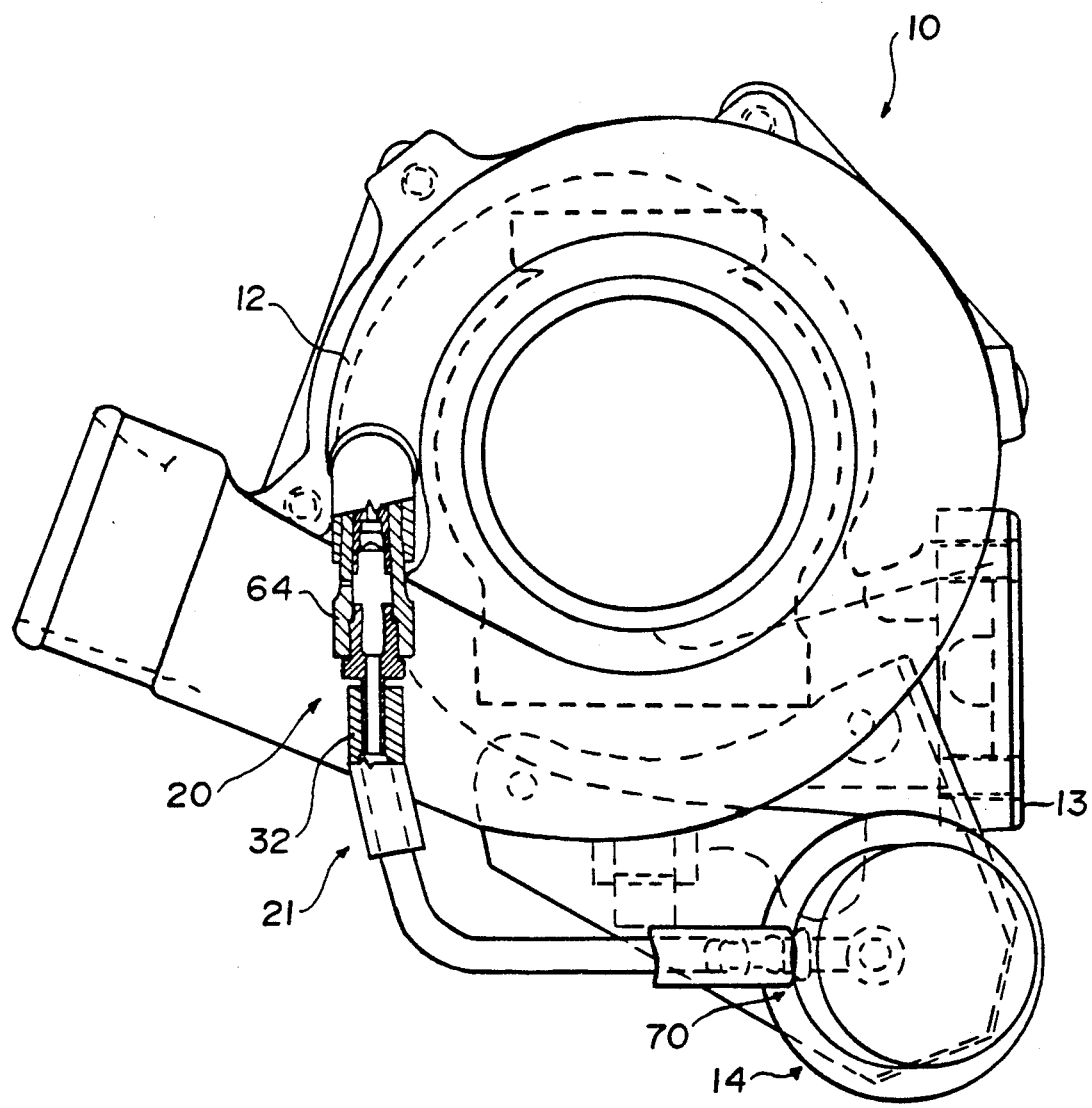
FIG. 1 is a perspective view of a compressor housing of a turbocharger and a wastegate actuator thereof showing the valve of the present invention mounted in a pressure line between an inlet of the wastegate actuator and an outlet from the compressor.

Referring now to the drawings in greater detail, there is illustrated therein a turbocharger 10 of the type used on a diesel internal combustion engine, including a compressor housing 12 and a turbine housing shown partially at 13. Attached to the turbine housing 13 is a wastegate actuator 14 for controlling the position of a wastegate valve (not shown) which in an open position permits exhaust gas entering the turbine housing 13 to be bypassed around the turbine to the exhaust outlet (not shown) and a closed position, the wastegate actuator being controlled in response to the compressor outlet or intake manifold pressure communicated thereto as by tube 21. The turbocharger, wastegate valve, and wastegate actuator 14 are all well known in the art. As described above, it is known for the wastegate valve of this combination to remain in a partially open position under certain conditions.

In accordance with the present invention, an additional valve 20 is mounted in the compressor pressure tube 21 extending from the compressor housing 12 to the wastegate actuator 14, the valve 20 preferably being mounted directly to the compressor housing 12.

Figure 2:
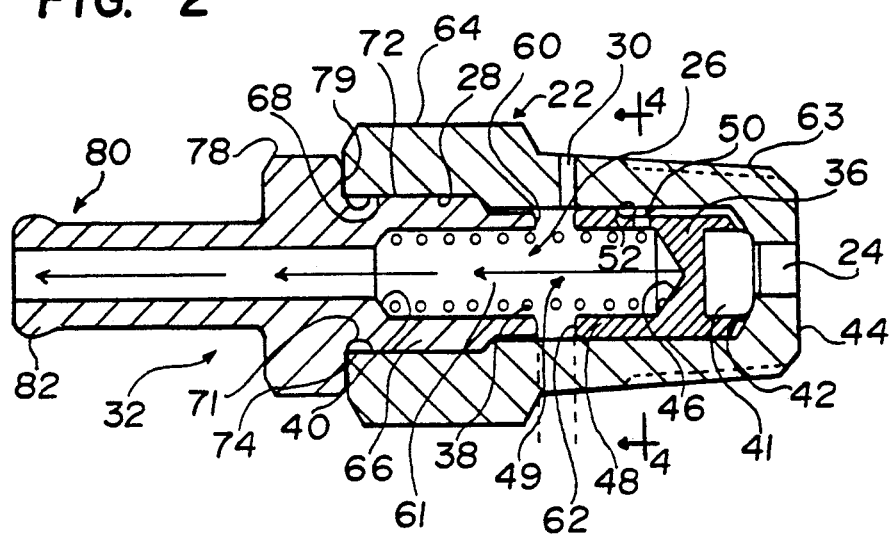
Figure 3:
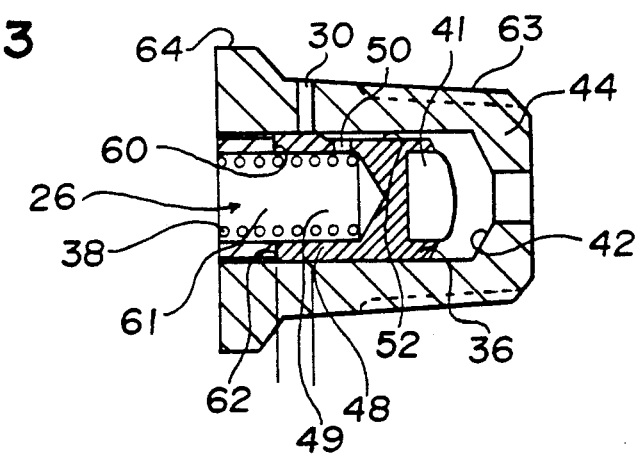
FIG. 3 is a view of a portion of the valve of FIG. 2 showing the valve in the open position.
Figure 4:
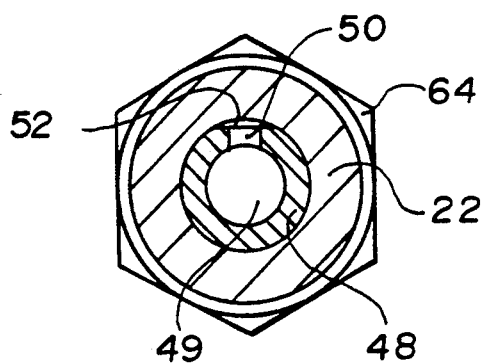
FIG. 4 is a radial cross-section through the valve and is taken along line 4—4 of FIG. 2.

As best seen in FIG. 2, the valve 20 comprises four structures, the first of which being a cylindrical valve body or housing 22 having an inlet 24 disposed at one end thereof opening to an interior chamber 26 thereof, an outlet 28 at the opposite end, and a radially extending orifice 30 of predetermined size disposed at a predetermined medial position in the housing 22 and leading from the interior chamber 26 to the ambient environment. An elongate tubular outlet nipple 32 is threadedly secured within the outlet 28 of the housing 22 and projects outwardly therefrom to an open end disposed to receive the enlarged end of tube 21.

A slidable piston 36 is closely fit within the chamber 26 and is positioned between the interior end 60 of outlet nipple 32 and the inlet 24 of the housing 22. A biasing spring 38 for the piston 36 extends between the interior wall 46 of the piston 36 and a spring seat 40 formed by a reduction in the inner diameter of the outlet nipple 32. The spring 38 biases a nose 41 of the piston 36 into abutment against a conical valve seat 42 therefor formed around the interior end of inlet 24 at inlet end 44 of the housing 22.

As shown, the piston 36 includes a solid nose 41 which is formed by an elastomeric insert therein to enhance sealing of the inlet opening 24. The piston 36 includes an internal cavity 49 defined by a circumferential sidewall 48 of the piston 36. This cavity 49 is in direct communication with the outlet of the outlet nipple 32 and thus with the wastegate actuator 14 through tube 21. The piston 36 further includes a metering orifice 50 extending through the sidewall 48 to a flat 52 machined on the exterior side of sidewall 48 and extending to the nose end 41 of the piston, the combination creating a pathway to cavity 49 of the piston 36 from the inlet opening 24 of the valve housing 22 when the piston is open. It will further be seen that the flat 52 does not extend all the way to the rear end of the piston 36 but rather terminates just beyond the orifice 50 so that the closely fit piston sidewall 48 forms a seal against the inner wall of the valve housing 22 disposed between the area of the flat 52 and the rear end of the piston to prevent compressor pressure from bypassing around the metering orifice 50.

The sidewall 48 of the piston 36 is of such longitudinal length to be spaced a predetermined distance away from an inwardmost shoulder 60 of the outlet nipple 32, the distance determining the total distance of piston 36 travel within the valve 20. It will be seen in FIG. 2 that the orifice 30 of the valve housing 22 is disposed along the length thereof to be in communication with the interior chamber 26 of the valve 20 and thus the outlet of nipple 32 when the piston 36 is seated against the inlet end 44 of the housing 22. However, when the piston 36 is unseated, with a rear edge 62 of the piston sidewall 48 abutting against the shoulder 60 of the outlet nipple 32, the rear portion of the piston sidewall 48 without the flat 52 slides over the orifice 30, closing off its communication with the interior chamber 26 of the valve 20.

As stated above, the valve housing 22 is engaged at its inlet end 44 to the compressor housing 12 of the turbocharger 10 as by pipe threads 63 disposed on the exterior of the end 44 of the valve housing 22 and its outlet nipple 32 is engaged to the compressor pressure tube 21 which engages an inlet 70 to the wastegate actuator 14 at its other end as shown in FIG. 1. Wrench flats 64 are disposed on the outer surface to assist the connection.

Likewise, to assure airtight engagement between the outlet nipple 32 and the valve housing 22, the nipple 32 is provided with a threaded surface 66 which engages an inner threaded surface of an inner diameter section 68 of the valve housing 22 up to a stop 79 formed by shoulder 78 to assure the appropriate distance is provided between the adjacent end 62 of the piston 36 and inner end surface 60 of the outlet nipple 32 within the housing 22 with the piston 36 in the closed position. To further assure no leakage from this juncture, a circumferential groove 71 is provided in outer wall 72 of the outlet nipple 32 where the nipple 32 intersects with outlet end 28 of valve housing 22 and an O-ring 74 is secured within the groove 71. To assure airtight engagement between an outlet end 80 of the outlet nipple 32 and the hose or tubing 21, the nipple 32 has a peripheral rib 82 extending therearound.

When the valve 20 is installed in the compressor pressure tube to the wastegate actuator 14 as described, the compressor outlet or intake manifold pressure is no longer constantly supplied to the wastegate actuator 14 as in the prior art. Rather, the pressure must increase to a point where it overcomes the biassing force of the spring 38 holding the piston 36 of the valve 20 against its seat 42.

When the pressure reaches this level, the piston 36 moves off seat 42 to a position with the piston end 62 abutting the shoulder 60 of the outlet nipple 32 while simultaneously sealing off the orifice 30 in the valve housing 22 from the interior 26 of the valve and from the outlet of nipple 32. As the piston 36 is forced away from the seat 42, compressor air pressure begins to flow into inlet 24 of the valve 20 into the flat 52 of the piston 36, through the metering orifice 50 in the piston 36, and into and out of the outlet nipple 32. The metering orifice 50 is of predetermined dimensions to maintain a pressure differential across the piston 36 when the piston is in the open position thereby preventing chattering against the valve seat 42. The orifice 50 will also create a delay in wastegate actuator 14 response time to the increasing pressure being applied thereagainst, which is beneficial to engine operation by providing a higher sustained intake manifold pressure for the engine during acceleration through peak torque speed.

Reversing the pressure situation, when the boost pressure falls to a level below that required to maintain the piston 36 unseated against force of the biassing spring 38, the piston 36 moves against the seat 42 to close the inlet 24, while opening communication between the interior chamber 26 of the valve 20 and the orifice 30, which acts as a bleed orifice 30 for the valve 20 to relieve any residual pressure still in the wastegate actuator 14 or in the tube 21 connected to the valve 20. This relief of residual pressure allows for maximum effect of the wastegate valve closing mechanism within the wastegate actuator 14 to compensate for the exhaust gas pressure trying to open the wastegate valve, thus maintaining the wastegate closed. Consequently, more exhaust gas flows to the turbine wheel, creating higher turbine speeds, inherently creating a greater intake pressure in the compressor, effectively increasing engine horsepower.

As defined above, the wastegate actuator control valve of the present invention provides a number of advantages some of which have been described above and others of which are inherent in the invention. It will be evident to those of ordinary skill in the art, upon reading the foregoing description, that modifications may be made to the valve without departing from the teachings herein. For example, the actuator control valve could be incorporated into the wastegate actuator rather than mounted as a separate valve in the compressor housing. Accordingly, the scope of the invention is only to be limited as necessitated by the accompanying claims.

What is claimed is:

1. In a wastegate valve assembly for a turbocharger, said assembly including a wastegate actuator for controlling said valve in response to turbocharger compressor outlet pressure being transmitted thereto through a means establishing fluid communication between a compressor housing of the turbocharger and an inlet of said wastegate actuator, the improvement comprising a control valve assembly for said actuator disposed in said fluid communication means between said compressor and said wastegate actuator, said control valve assembly comprising:
    a valve housing including an inlet thereto communicating with said compressor, an outlet therefrom communicating with said wastegate actuator, and an internal cavity,
    a slidable piston disposed in said cavity, said piston being biassed to a first position closing said inlet and having a second position displaced from said inlet upon said compressor pressure being sufficiently large to overcome said bias, said piston having communication means permitting pressurized air entering said inlet, upon said piston being in said second position, to be communicated to said valve housing outlet, said piston communication means comprises a flat in a peripheral sidewall of said piston and a metering orifice through said sidewall into said flat, said valve housing further having a bleed orifice therein, said orifice being disposed to be blocked by said piston when said piston moves to said second position displaced from said inlet.

2. The invention in accordance with claim 2 wherein said piston is biassed to said first closed position by a spring disposed within said valve housing.

3. A control valve for an actuator of a wastegate of a turbocharger comprising:
    a housing having an inlet end disposed in fluid communication with an outlet from a compressor of a turbocharger, an outlet end, and an interior chamber;
    an outlet nipple engaged to and within the outlet end of said housing and in fluid communication with an inlet to the wastegate actuator;
    a piston slidably disposed within the housing for movement between the inlet end of the housing and an inner end of said outlet nipple, the piston including a sidewall including a flat disposed on the outer surface thereof which communicates with a metering orifice in said sidewall, said housing including a bleed orifice therein positioned to establish communication of the interior of the valve housing with the atmosphere, when said piston abuts against said housing inlet end, and to be prevented from establishing such communication with said housing interior upon said piston abutting against said inner end of said nipple; and
    a biasing spring for biasing said piston into abutting relation with the housing inlet end.

4. The invention according to claim 3 and said piston sidewall closing off said communication between said bleed orifice and the housing interior when said piston is positioned abutting against said inner end of said outlet nipple, said piston being unseated from the valve seat at the inlet end of said housing.

5. The valve of claim 4 wherein said outlet nipple includes an internal shoulder which acts as a seat for the biasing spring.

6. The valve of claim 3 wherein said piston includes a conical head which rests within a conical seat for same in said housing inlet end in its normal condition.

7. The valve of claim 3 wherein said outlet nipple includes an enlarged flange portion which abuts against the outlet end portion of the housing to accurately locate the axial position of said nipple in said housing.

8. The valve of claim 7 wherein said outlet nipple is threadedly engaged within said outlet end of said housing.

9. The valve of claim 8 wherein an O-ring is engaged within a peripheral groove extending around said outlet nipple at the juncture of said flanged portion thereof with the valve housing.

10. A valve for controlling actuation of a wastegate actuator of an engine turbocharger, the valve comprising:
    a cylindrical valve housing defining a chamber therein having an inlet end which is engageable to an outlet from a compressor of the turbocharger and an outlet disposed in fluid communication with said actuator;
    shoulder means disposed within an outlet end of said housing and extending a predetermined distance thereinto to a distal end;
    a piston slidably disposed within said housing and having a closed forward end disposed to seat against a valve seat, said valve seat being located about an inlet opening in the inlet end of said housing, said piston having a range of travel away from said valve seat limited by abutment of a rear end of said piston with said shoulder means, said piston having means establishing fluid communication between the exterior portion of said piston and an interior portion thereof communicating with said housing outlet;

a biasing spring disposed within said housing and biasing said piston against said valve seat to close said inlet;

said cylindrical valve housing having a pressure bleeding orifice extending therethrough into said chamber which is positioned between said rear end of said piston, when said piston is seated, and said shoulder means; and said piston having a sidewall which closes said pressure bleeding orifice when said piston abuts against said shoulder means.

11. The invention in accordance with claim 10 wherein said means establishing fluid communication between said exterior and interior portions of said piston comprising a flat disposed on the exterior of the piston sidewall and extending to said forward end thereof and a metering orifice through said sidewall into said flat.

* * * * *